May 8, 1962 F. R. KERNS 3,032,795
MACHINE FOR CLEANING A PLURALITY OF SPACED STACKED ARTICLES
Filed Jan. 6, 1958 3 Sheets-Sheet 1

INVENTOR.
FRED R. KERNS

May 8, 1962 F. R. KERNS 3,032,795
MACHINE FOR CLEANING A PLURALITY OF SPACED STACKED ARTICLES
Filed Jan. 6, 1958 3 Sheets-Sheet 3

INVENTOR.
FRED R. KERNS

United States Patent Office 3,032,795
Patented May 8, 1962

3,032,795
MACHINE FOR CLEANING A PLURALITY OF SPACED STACKED ARTICLES
Fred R. Kerns, Cleveland Heights, Ohio, assignor to The Electric Storage Battery Company, a corporation of New Jersey
Filed Jan. 6, 1958, Ser. No. 707,161
3 Claims. (Cl. 15—77)

The present invention relates to machines for the manufacture of storage batteries or the like, and more particularly to a machine for cleaning the lugs of pasted battery plates preparatory to bonding connecting straps thereto.

Connecting straps serve the dual function of electrically connecting the plates of one polarity of a battery element in parallel circuit and of forming the mechanical bond connecting them together in spaced relationship. Because of this dual function the bond formed between the connecting strap and the lugs must be strong and complete.

Known and commercially feasible testing techniques employed prior to assembly of the element in a battery often will not reveal an inadequate bond between one of the lugs and the connecting strap. The subsequent discovery of the failure of one plate lug to be properly bonded to the connecting strap can mean that the strap and all the plates bonded to it must be scraped and/or expensive repair operations must be performed.

One of the principal objects of the invention is to provide a novel and improved machine for cleaning a connecting lug of a battery plate or all of the lugs of a plurality of battery plates stacked in such a manner as to have a clearance between aligned lugs so as to assure a good electrical contact and mechanical union between the plate lugs and connecting straps subsequently bonded thereto.

Another object of the present invention is the provision of a new and improved machine of the character referred to which is simple in construction and economical in its operation.

Still another object of the present invention is the provision of a new and improved machine for cleaning connecting lugs of battery plates or the like and which comprises a movable carrier adapted to support and move individual battery plates or stacks of plates, preferably conventional strapless battery elements, to and from lug brushing positions or stations having rotatable brushing means adapted to clean the lugs of the plates.

A still further object of the invention is to provide a novel and improved machine of the character referred to, comprising a plurality of cylindrical type cleaning brushes rotated about nonparallel axes inclined to the planes of the lugs being cleaned.

Another object of the invention is to provide a novel and improved lug cleaning machine having a pair of lug cleaning cylindrical type brushes mounted on non-parallel axes inclined to the plane of lug travel in such manner that one brush cleans one side and the other brush the other side of the lug passed in contact therewith.

The invention resides in certain constructions and combinations and arrangements of parts, and further advantages and objects thereof will be obvious to those skilled in the art from the following description of the preferred embodiment described herein and shown in the accompanying drawings which form a part of this specification, and wherein.

Figure 1:
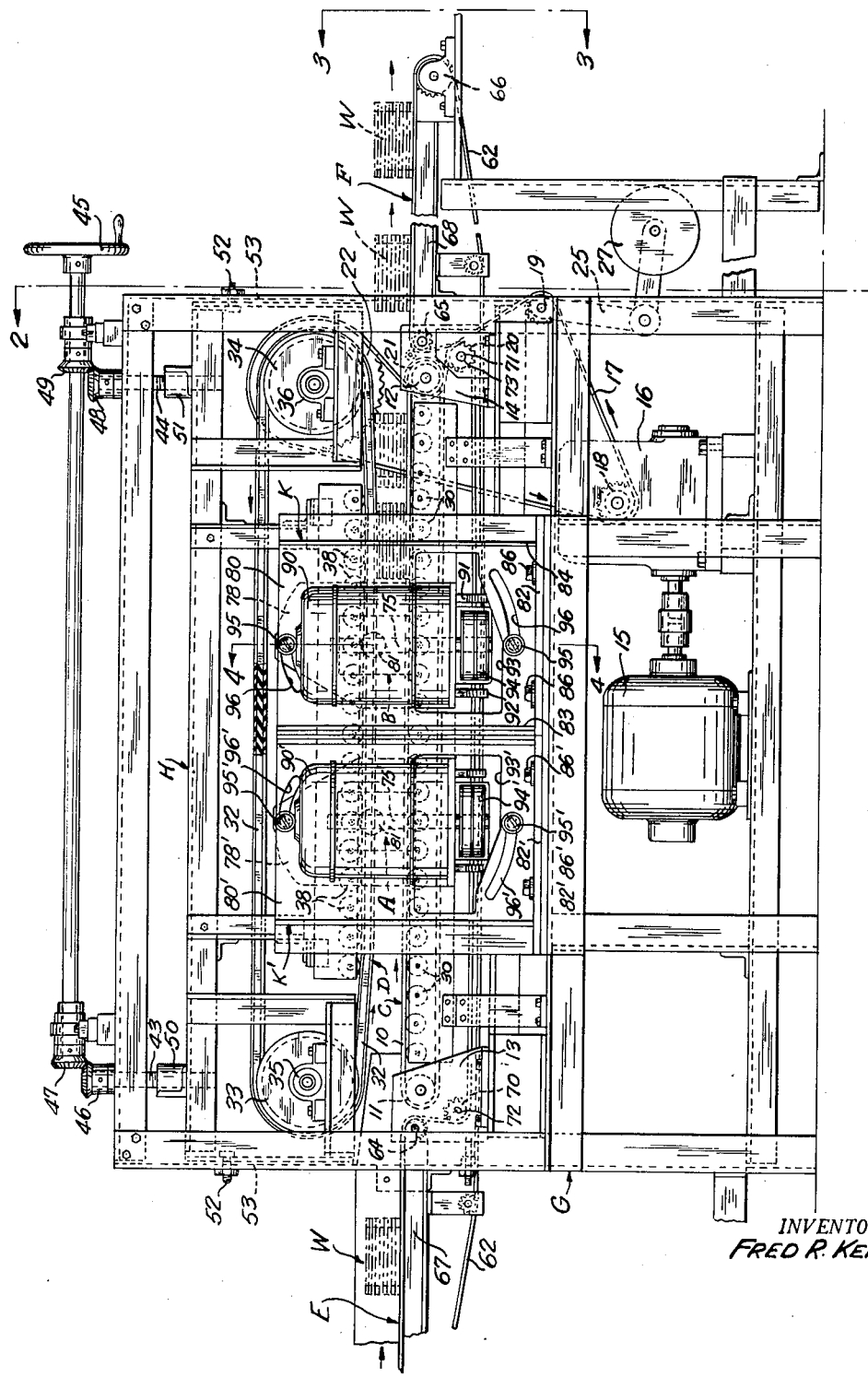
FIG. 1 is a front elevational view of a machine embodying the present invention.
Figure 2:
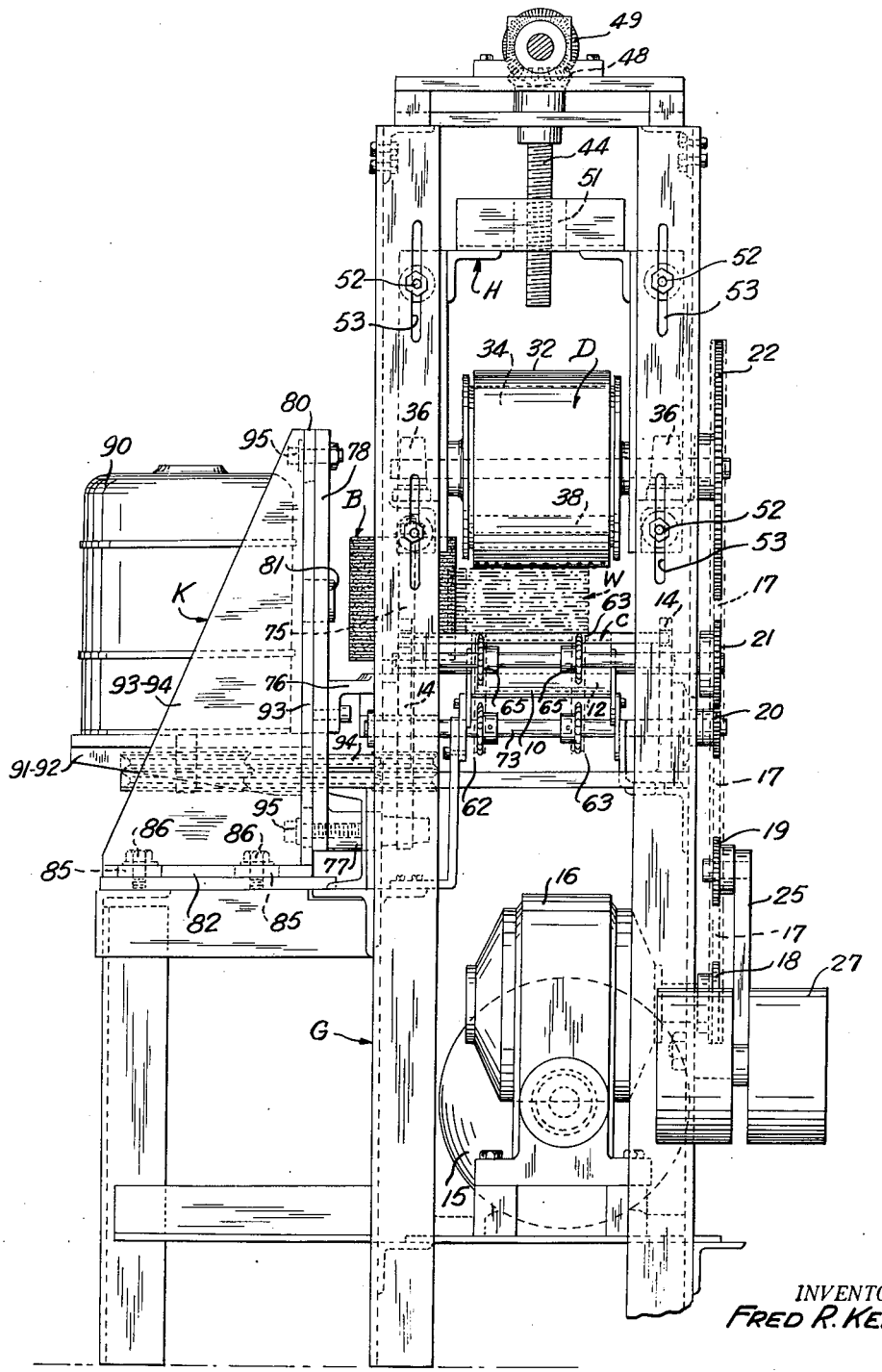
FIG. 2 is a fragmentary and elevational view taken substantially on line 2—2 of FIG. 1, and showing a group of battery plates in lug brushing position.
Figure 3:
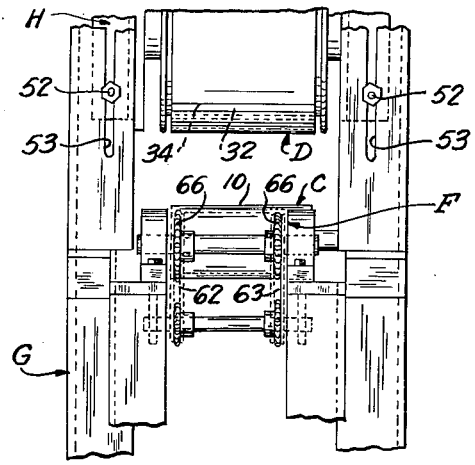
FIG. 3 is a fragmentary and elevational view taken substantially on line 3—3 of FIG. 1, looking toward the end of the transfer conveyor at the right-hand or discharge end of the machine.
Figure 4:
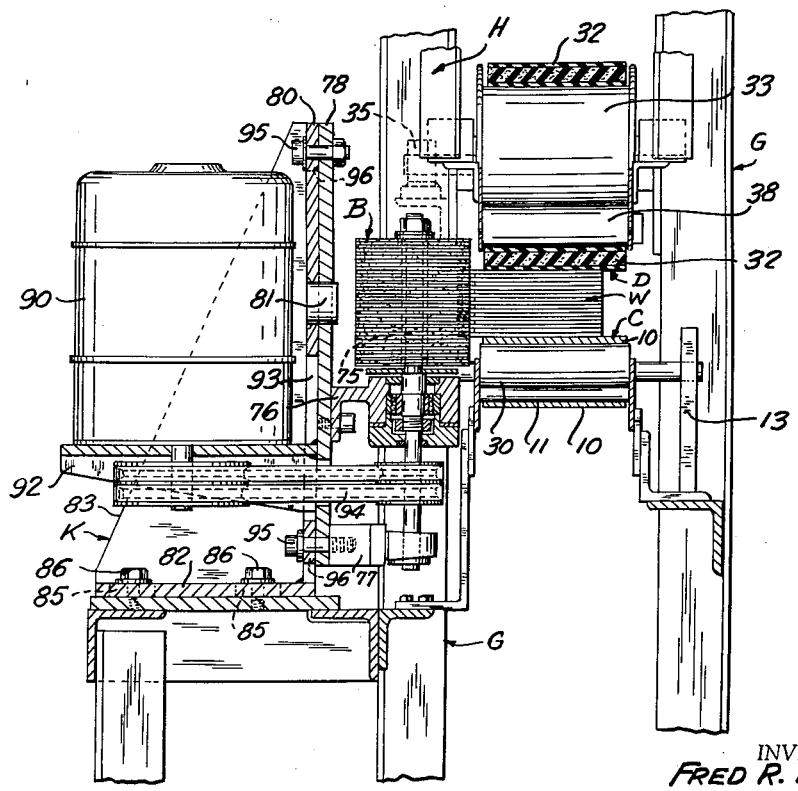
FIG. 4 is a fragmentary sectional view, with portions in elevation, approximately on the line 4—4 of FIG. 1.

Although the present invention is susceptible of various embodiments, it is herein embodied in a machine especially designed for the brushing of the lugs for battery plates such as are employed in conventional automotive type lead-acid storage batteries. The machine will clean all of the lugs of a battery element in one operation, which operation is preferably performed immediately before the connecting strap bonding operation, thus assuring the presence of absolutely clean lugs for the bonding operation. In general the machine shown comprises a work carrier in the form of a conveyor for carrying one or a group of battery plates in tandem relationship past a plurality of brushes which remove paste or other foreign material adhering to the plate lugs.

Referring to the drawings wherein corresponding elements are designated by like reference characters, stacks of battery plates having aligned lugs separated a small distance, in the present instance strapless battery elements W are carried past cylindrical type brushes A, B by a work carrier comprising a main conveyor designated generally by the reference character C and a second or hold down conveyor designated generally by the letter D. The machine also has auxiliary conveyors for feeding the plates to the work carrier and carrying the brushed plates away from the work carrier. The auxiliary conveyors which, in the embodiment shown, are in one sense a continuation of one another, are herein referred to as the auxiliary feed and discharge conveyors and designated generally by the reference characters E and F, respectively.

The main conveyor C comprises a flexible belt 10 looped or reeved about a pair of roll-like pulleys 11, 12, one rotatably supported adjacent either end of the machine by suitable brackets 13, 14, respectively, forming a part of the welded upper frame designated generally by the reference character G, the particular construction of which forms no part of the present invention. The pulley 12 at the right-hand end of the machine as viewed in FIG. 1, that is, the discharge end of the machine is driven by an electric motor 15 through a variable speed transmission 16 and a sprocket chain 17 reeved about a drive sprocket 18 on the output shaft of the transmission 16, an idler takeup sprocket 19, a driven sprocket 20 which will be hereinafter referred to, a second driven sprocket 21 fixed to the pulley 12, and a third driven sprocket 22 which sprocket, like the sprocket 20, will be subsequently referred to. The idler sprocket 19 is rotatably secured to one end of a bell crank lever 25 pivotally supported in the frame G, the other end of which is provided with a counterweight 27.

The upper reach of the belt 10 of the main conveyor C is supported between the pulleys 11, 12 by a plurality of free running rollers 30 rotatably supported in the frame G in position to engage underside of the upper reach of the belt and support it against sagging under the weight of the battery plates.

The hold down conveyor D comprises a belt 32 preferably faced with soft rubber or the like, which is reeved around end pulleys 33, 34. The pulleys 33, 34 are suitably journalled in brackets 35, 36 which brackets are fixed to and form part of an auxiliary frame H. The frame H carries a plurality of back-up rollers 38 which are in intimate contact with inner surface of the lower reach of the belt 32 when the device is in operation. The contact of the upper belt 32 and the rolls 38 is in a plane which parallels the plane of contact of the lower belt 10 and the rolls 30.

The outer surface of the upper reach of the belt 10 is parallel to outer surface of the lower reach of the belt 32. These parallel reaches or portions of the belt 10, 32 or, more particularly, the outer surfaces thereof together define the upper and lower limits of the path of travel of the work through the machine. In the preferred and disclosed embodiment of the invention the path of travel is maintained at slightly less than the thickness of the strapless battery elements W which are to be moved through the machine. This spacing is adjusted so as to permit the battery elements to be gripped and firmly held in a vise-like action resulting from the resiliency of the belt 32. This vise-like action is provided to hold the battery elements in position as a brushing operation is being formed. Another and outstanding advantage of the resilient belt is that it automatically compensates for any variation in thickness in elements of the same type.

In most battery manufacturing plants a variety of sizes of battery elements is manufactured and for the purpose of adapting the machine to battery elements of different thickness provision is made for adjusting the main conveyors C, D relatively toward and from each other to adjust the parallel spacing therebetween along the work path. To accomplish this, the auxiliary frame H which carries the hold down conveyor D is slidably supported in vertical guideways in the main frame G and movable vertically therein by a pair of screw shafts 43, 44 one adjacent to either end of the frame H and simultaneously rotatable by a crank 45. Rotation of the adjustment crank 45 turns bevel gears 46, 47 and 48, 49 which in turn cause rotation of threaded shafts 43, 44. The screw shafts are in threaded engagement with nuts 50, 51 fixed in the frame H so that rotation of the screw shafts shifts the adjustable frame H selectively upward or downward. The frame H may be fixed in any adjusted position by bolts 52 at both ends of the machine, projecting through elongated vertical slots 53 in the frame G.

The auxiliary feed and discharge conveyors E, F which transport the battery elements W to the machine proper and carry the brushed elements away from the machine are, as previously stated, formed of a single conveyor comprising two spaced sprocket chains 62, 63 reeved about suitable sprocket wheels supported in the main frame G. Opposite ends of the reach of the chains 62, 63 which form the feed conveyor E pass over a pulley 64 journalled in a bracket 13 forming a part of the main frame G and a second feed reach defining pulley not shown.

Opposite ends of the reach of the chains 62, 63 which form the discharge conveyor F pass over a pulley 65 journalled in a bracket 14 forming a part of the main frame G and a second discharge reach defining pulley 66 also forming a part of the frame G. Intermediate the pulleys which define the feed and discharge reaches E, F, the chains 62, 63 pass above and are supported by the vertical flanges of pairs of angle irons, 67, 68 respectively forming a part of the main frame G. Between the pulleys 64, 65 the chains pass downwardly and underneath pulleys 70, 71 connected to shafts 72, 73 journalled in the brackets 13, 14 respectively. Between the pulleys 72, 73, the chains extend underneath the main conveyor C, through the lower part of the machine. The shaft 73 carries the sprocket wheel 20 previously mentioned and forms the driving shaft for the chains 62, 63.

The sprocket 21 is connected to the pulley 12 to drive the first main conveyor C and the sprocket 22 is connected to the pulley 34 to drive the second main conveyor D. Since the sprockets 20, 21, 22 are all connected to the drive chain 17 and driven by the motor 15, a common source of power is provided and the conveyors are driven at a uniform synchronized speed.

The cylindrical type lug cleaning brushes A, B are located about mid-point of the path of travel through the machine formed by the conveyors C, D. The brushes A, B are located immediately adjacent to but at one side of the main conveyors and extend above and below the path defining reaches of the conveyors. The brush axes are in angular relationship to the planes of the lugs of the battery plates in order that one side of the lugs may be cleaned by one brush and the other sides by the other brush. The brushes A, B are both supported in the same manner by the frame G for linear adjustment towards and from the work carrier and angularly spaced about axes parallel with said direction of linear adjustment and are driven by individual electric motors and only the support and drive for the brush B in the second work station or position and its drive will be described in detail. The corresponding parts for supporting and driving the brush A will be designated by the same reference characters with a prime mark affixed thereto.

The brush B is detachably fixed, to permit replacement thereof when worn, etc., upon the uper part of a generally vertically extending shaft 75, the lower part of which is rotatably supported by suitable bearings in two vertically spaced members 76, 77 bolted or otherwise secured to the rear side of a vertically positioned plate 78 adjustably connected to the rear side of a second vertically positioned plate 80 for rotation about a pivot 81 fixed in one of the plates and rotatable in a suitable aperture in the other. The plate 80 forms a part of a bracket K which includes a bottom plate 82 and two side plates 83, 84. The bottom plate 82 is provided with a plurality of slots 85, extending transversely of the path of travel of the machine, and is connected to a table-like forwardly extending section of the frame G by bolts 86 projecting through the slots 85 and are threaded into suitable tapped holes in the frame G. The construction is such as to allow the bracket K and, in turn, the brush B to be adjusted toward and from the work carrier.

The brush B is rotated by an electric motor 90 mounted upon two forwardly extending brackets 91, 92, the rear ends of which project through an opening 93 in the plate 80 below the pivot 81, where they are connected to the front face of the plate 78. The drive shaft of the motor 90 is connected to the shaft 75, which carries the brush B by a multiple belt drive designated generally at 94 and which may be of any commercial construction. The plate 78 together with the brush B and the driving motor 90 therefor together with the drive 94, etc., can be adjusted relative to the plate 80 about the axis of pivot 81 and secured in any adjusted position by a plurality of bolts 95 projecting through a pair of arcuate slots 96 in the plate 80 of the bracket K, one located above and the other below the pivot 81. As previously stated, the axes of the brushes A, B are preferably inclined in opposite directions with respect to the plane of the lugs, which in this instance coincides with the plane of travel of the plates through the machine, during operation of the machine. This facilitates the brushing of opposite sides of the lugs by successive brushes during a single pass of the battery elements through the machine. In the embodiment shown the arcuate slots 96 permit the brushes to be moved approximately 45° from the vertical position; that is, the position in which they are shown in the drawings. In the embodiment shown the only difference between the supports for the respective brushes A, B is that the plates 78, 78′, which are nonsymmetrical, are of the opposite hand and the slots 96, 96′ extend in opposite directions from vertical planes through the center axes of the pivots 81, 81′.

From the foregoing it will be apparent that the objects of the invention heretofore enumerated and others have been accomplished and that there has been provided a novel and improved machine for brushing and thus cleaning the connecting strap lugs of battery plates, either singularly or in groups; for example, strapless battery elements.

While the preferred embodiment of the invention has been described in considerable detail, it will be apparent that the invention is not limited to the particular construction shown and described but may be otherwise embodied. The work carrier, for example, does not have to be formed of conveyor type belts; nor is it necessary that the plates be carried in a straight line, that they lie flat, or that brushes be confined to one side of the machine. It is the intention to hereby cover all adaptations, modifications and uses of the machine shown and the disclosed method of cleaning battery plate lugs, and the like, which come within the practice of those skilled in the art to which the invention relates and the appended claims.

What I claim is:

1. A battery lug cleaning machine comprising a frame, conveying means on said frame for carrying along a predetermined path of travel a group of unconnected stacked battery plates spaced with interleaved separators, said battery plates having flat lugs projecting from one side, means for holding said stacked battery plates on said conveying means, a pair of rotary cylindrical brushes carried by said frame adjacent to said path of travel, the bristles of said brushes extending into said path of travel a distance substantially equal to the length of said lugs, the axis of rotation of said brushes being in a plane perpendicular to the path of travel of said stacked battery plates, one of said brushes being inclined in one direction with respect to said path of travel of said battery plates to engage the top surfaces of said lugs parallel with said path of travel, the other said brushes being inclined in the opposite direction with respect to the path of travel of said battery plates to engage the bottom surfaces of said lugs parallel to said path of travel and means for rotating said brushes.

2. Apparatus as specified in claim 1 wherein said means for holding said battery plates on said conveying means comprises a resilient belt adapted for movement parallel with said conveying means.

3. A machine for cleaning vertically stacked spaced parallel articles comprising, a frame, conveying means on said frame for carrying said articles along a predetermined path of travel, a pair of rotary cylindrical brushes carried by said frame adjacent to said path of travel, the bristles of said brushes extending into said path of travel a sufficient distance to engage said spaced articles, the axis of rotation of said brushes being in a plane perpendicular to the path of travel of said stacked articles, one of said brushes being inclined in one direction with respect to said path of travel of said articles to engage the top surfaces of said articles parallel with said path of travel, the other of said brushes being inclined in the opposite direction with respect to the path of travel of said articles to engage the bottom surfaces of said articles parallel to said path of travel and means for rotating said brushes.

References Cited in the file of this patent

UNITED STATES PATENTS

| | | |
|---|---|---|
| 1,158,752 | Volz | Nov. 2, 1915 |
| 1,544,185 | Schnell | June 30, 1925 |
| 1,617,469 | Weber | Feb. 15, 1927 |
| 1,629,038 | Leightlitner | May 17, 1927 |
| 2,170,783 | Cousart | Aug. 22, 1939 |
| 2,252,787 | Sarver | Aug. 19, 1941 |
| 2,293,858 | Schafer | Aug. 25, 1942 |
| 2,680,938 | Peterson | June 15, 1954 |